(No Model.)

J. WEISS.
DENTAL APPLIANCE.

No. 598,235. Patented Feb. 1, 1898.

UNITED STATES PATENT OFFICE.

JULIUS WEISS, OF VIENNA, AUSTRIA-HUNGARY.

DENTAL APPLIANCE.

SPECIFICATION forming part of Letters Patent No. 598,235, dated February 1, 1898.

Application filed October 24, 1897. Serial No. 656,333. (No model.)

*To all whom it may concern:*

Be it known that I, JULIUS WEISS, a citizen of the Empire of Austria-Hungary, and a resident of Vienna, in the Empire of Austria-Hungary, have invented an Improvement in Dental Appliances, of which the following is a specification.

The present invention consists of an improved dental appliance by means of which the upper and lower sets of teeth may be supported in their natural positions to enable students to practice operating thereon; and in order to render the present specification more easily intelligible reference is had to the accompanying drawings, in which similar letters of reference denote similar parts throughout the several views.

Figure 1:
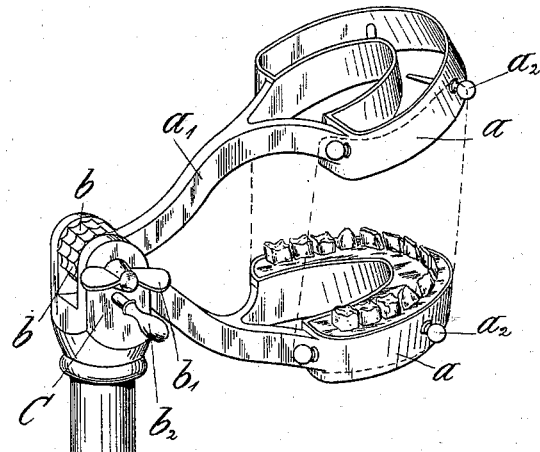
Figure 2:
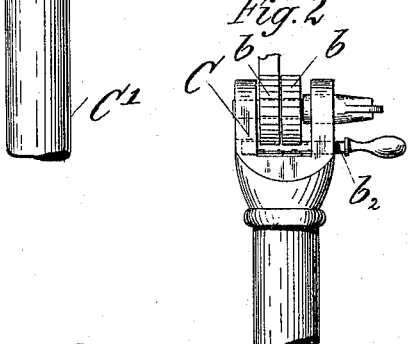

Figure 1 is a perspective view of the device; Fig. 2, an end view of the hinge, and Fig. 3 a perspective view of a modified form.

The device consists of the upper and lower jaws $a\ a$, having arc-shaped openings therethrough, said openings having their walls tapering toward the top of the upper jaw and the bottom in the lower jaw. The said upper and under jaws are connected by means of levers $a'$ and bosses $b\ b$ to a pivot extending between the bifurcations C at the end of a standard C', said pivot being provided with a clamping-nut $b'$, by means of which the two bosses $b\ b$ may be clamped together, as shown at Fig. 2. The periphery of the said bosses is provided with teeth, as shown at Fig. 1, in order to enable the said bosses, and with them the jaws, to be fixed in any desired position relative to each other by means of a pin $b^2$, inserted through a suitable orifice in the lower part of the fork C, said pin engaging the spaces between the teeth of the two bosses, which correspond in position when the jaws are at the desired angle apart. The outer rim of the upper and lower jaws is pierced by pins $a^2$, the ends of which extend into the cavities between the outer and inner rims of the said jaws. These pins serve to retain the plaster-of-paris in position in the said cavities, as hereinafter particularly described.

In practice the cavities are partially filled with wax or the like and the teeth arranged therein. When this has been accomplished, the remaining part of the cavity is filled with plaster-of-paris and the latter allowed to dry. The wax is then removed and the space thus formed filled up with plaster-of-paris, so that when ready for practice the teeth appear in a bed of plaster-of-paris. The student may then practice operating on the teeth, which will be in the position which they naturally occupy. If it is required to represent the cheeks of the patient, strips of some suitable flexible substance may be stretched between the upper and lower jaws, said substance being attached to the heads of the pins $a^2$.

Figure 3:
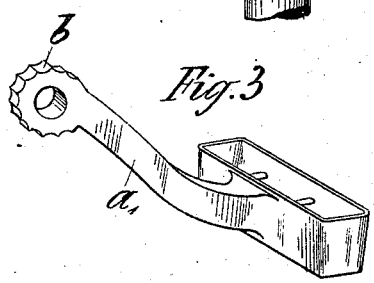

In Fig. 3 a simplified form of the invention is illustrated, the jaws being represented by troughs, this form of device being preferable for beginners.

Instead of wax putty may be employed to hold the teeth in position while the frame or cavity of the jaws is being filled with plaster-of-paris.

I claim as my invention—

1. The combination of upper and lower jaws, $a$, $a$, having arc-shaped cavities as specified; a series of pins extending from the outer rim into said cavities; arms to said jaws having toothed bosses $b\ b$; a pivot to support said arms; with a bifurcated stand to receive said pivot and arms and a pin extending through said bifurcation below said pivot, and adapted to engage said boss teeth substantially as described.

2. The combination of upper and lower jaws having backwardly-extending arms, with means for pivoting said arms together and for retaining the same in any desired position; pins extending through the outer rim of said jaws; and flexible material extending between the pin-heads of the upper and lower jaws at the sides substantially as described.

In witness whereof I have hereunto set my hand in presence of two witnesses.

JULIUS WEISS.

Witnesses:
 HENRY C. CARPENTER,
 CHAS. E. CARPENTER.